US005657068A

United States Patent [19]
Ohta

[11] Patent Number: 5,657,068
[45] Date of Patent: Aug. 12, 1997

[54] COLOR IMAGE PROCESSING APPARATUS AND CONVERSION METHOD

[75] Inventor: Ken-ichi Ohta, Kawasaki, Japan

[73] Assignee: Canon Kabushiki Kaisha, Tokyo, Japan

[21] Appl. No.: 38,898

[22] Filed: Mar. 29, 1993

[30] Foreign Application Priority Data

Apr. 2, 1992 [JP] Japan .................................. 4-080731
Jun. 26, 1992 [JP] Japan .................................. 4-168968

[51] Int. Cl.$^6$ ................................................ H04N 1/21
[52] U.S. Cl. ....................... 347/232; 347/247; 347/251; 358/296
[58] Field of Search ........................ 346/108, 762, 346/160; 358/296, 298, 300, 302; 348/645, 649, 656; 347/232, 251, 240, 247, 115

[56] References Cited

U.S. PATENT DOCUMENTS

| 4,633,299 | 12/1986 | Tanaka | 348/656 |
| 5,089,882 | 2/1992 | Kaye et al. | 348/645 |
| 5,371,609 | 12/1994 | Suzuki et al. | 358/448 |

*Primary Examiner*—Mark J. Reinhart
*Attorney, Agent, or Firm*—Fitzpatrick, Cella, Harper & Scinto

[57] ABSTRACT

A minimum value of input color image signals (R, G, B) is extracted, difference signals between the extracted minimum value and the input signals (R, G, B) are calculated, and matrix conversion is executed based on the difference signals, thereby obtaining desired output color image signals having a color reproduction range different from that of the input color image signals.

23 Claims, 9 Drawing Sheets

COLOR IMAGE PROCESSING APPARATUS AND CONVERSION METHOD

BACKGROUND OF THE INVENTION

The present invention relates to a color image processing apparatus and a conversion method for converting a first color-separated signal particularly in the color image processing apparatus into a second color-separated signal.

Currently, as a conventional apparatus for visualizing and outputting a color imager a color CRT monitor apparatus, a color hard copy apparatus, or the like is known. The former apparatus intensity-modulates the light emission levels of phosphors of three colors, i.e., R, G, and B on a tube surface, and forms a visual image by additive color mixture. The latter apparatus forms a color image on paper by subtractive color mixture using Y (yellow), M (magenta), C (cyan), and K (black) coloring materials.

Figure 3:
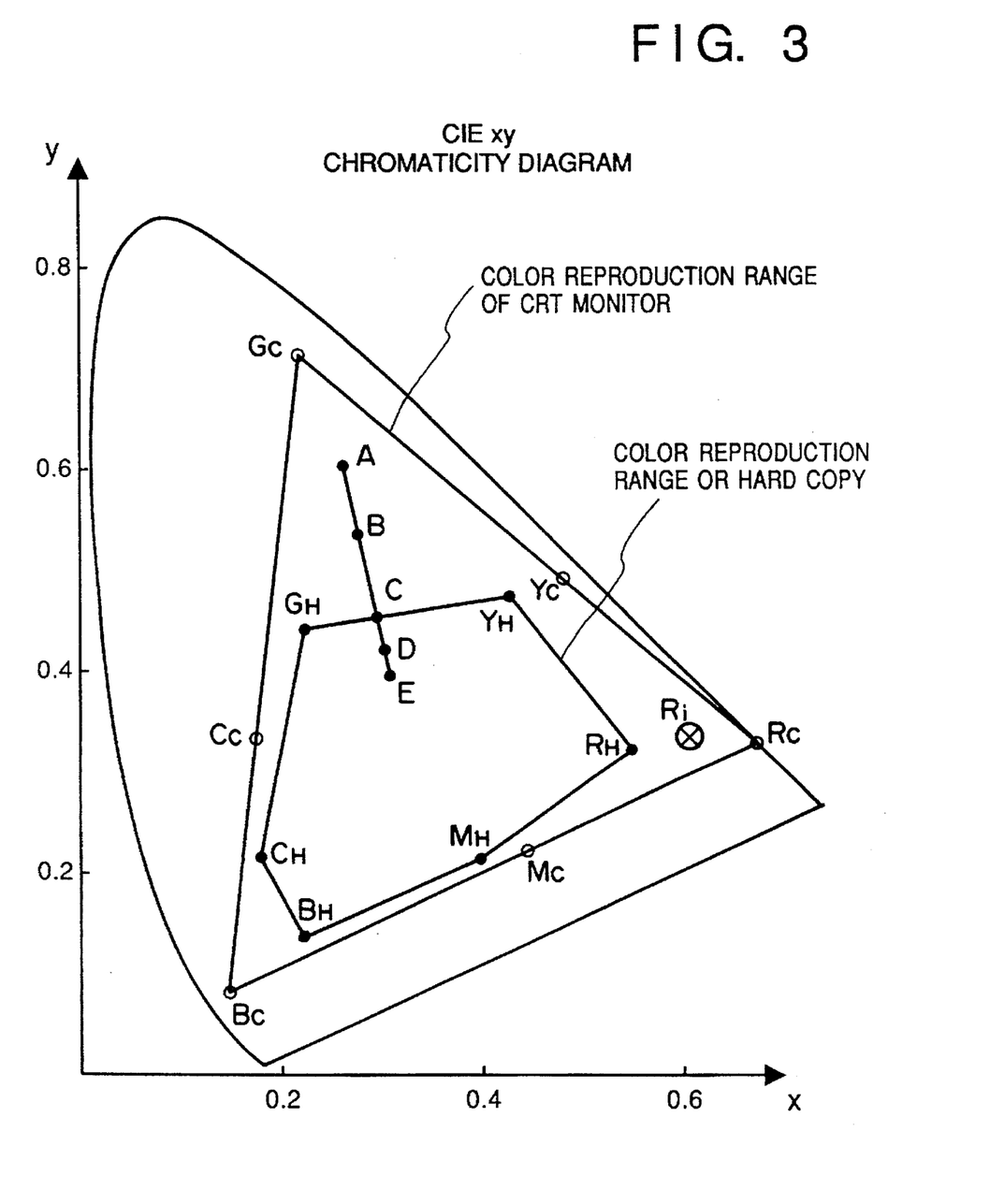
FIG. 3 is a CIE xy chromaticity diagram.

The above-mentioned two image display apparatuses have different color reproduction performances in principle, and the color reproduction range of the CRT apparatus is normally wider than that of the hard copy apparatus, as shown in FIG. 3.

Therefore, when two colors exist at points A and B in a certain image, if this image is displayed on the CRT apparatus, these colors are produced as different colors. However, if this image is output as a hard copy, since both the colors at the points A and B are reproduced as a color at a point C, the two colors cannot be distinguished from each other. As a result, information of an original image is lost.

Thus, when an input color image is output as a hard copy, a method in which chrominance signals in the image are converted to fall within the color reproduction range of the hard copy, and the converted signals are output may be adopted. More specifically, when chrominance signals are converted, so that the point A becomes a point D, and the point B becomes a point E in FIG. 3, colors on the hard copy can be distinguished from each other. However, since various methods of such conversion may be used, an output image may become unnatural as a whole depending on the conversion methods.

In order to solve such a problem, the following method of conversion of an inputted color image has been proposed. In this method the chrominance signal information included in the inputted image is mapped in the color reproduction range of the hard copy according to a matrix conversion, while preserving the primary colors of the color image (red, green, blue, cyan, magenta, yellow). In this case, however, reproduction of an achromatic color (gray) cannot be guaranteed (an achromatic color on the CRT apparatus cannot become an achromatic color on the hard copy).

A color having the highest saturation is detected with reference to the distribution of chrominance signals included in an input image, and the detected color is mapped in the color reproduction range of the hard copy apparatus. However, upon detection of the saturation, an input color image is evaluated on an RGB signal space. However, since the RGB signal space does not include nonlinearity of visual sense characteristics of man, even when a color having the highest saturation is detected, the detected color is not always a color having the highest saturation obtained when it is actually observed by human eye.

SUMMARY OF THE INVENTION

The present invention has been made in consideration of the conventional drawbacks, and has as its object to provide a color image processing apparatus and a conversion method, which guarantee reproduction of an achromatic color, and map a first color reproduction range to a second color reproduction range.

It is another object of the present invention to provide a color image processing apparatus, which can determine matrix conversion coefficients on the basis of the distribution of chromatic signals included in an input color image signal on a uniform space.

The purpose of the present invention is to provide a conversion method, included in a color image procession apparatus, capable of easily and relatively accurately mapping the first color reproduction range in the second color reproduction range.

In order to accomplish the above objective, the color image processing apparatus is described according to the preferred embodiment as a color image processing apparatus for converting first color-separated signals into second color-separated signals, comprising: extraction means for extracting a minimum value in units of pixels from the first color-separated signals; generation means for generating difference signals between the minimum value extracted by said extraction means and the first color-separated signals; and conversion means for converting the first color-separated signals into the second color-separated signals on the basis of the difference signals generated by said generation means.

Other objects of the present invention will become apparent from the following detailed description taken in conjunction with the accompanying drawings.

DESCRIPTION OF THE PREFERRED EMBODIMENTS

The preferred embodiments of the present invention will be described in detail hereinafter with reference to the accompanying drawings.

<First Embodiment>

Figure 1:
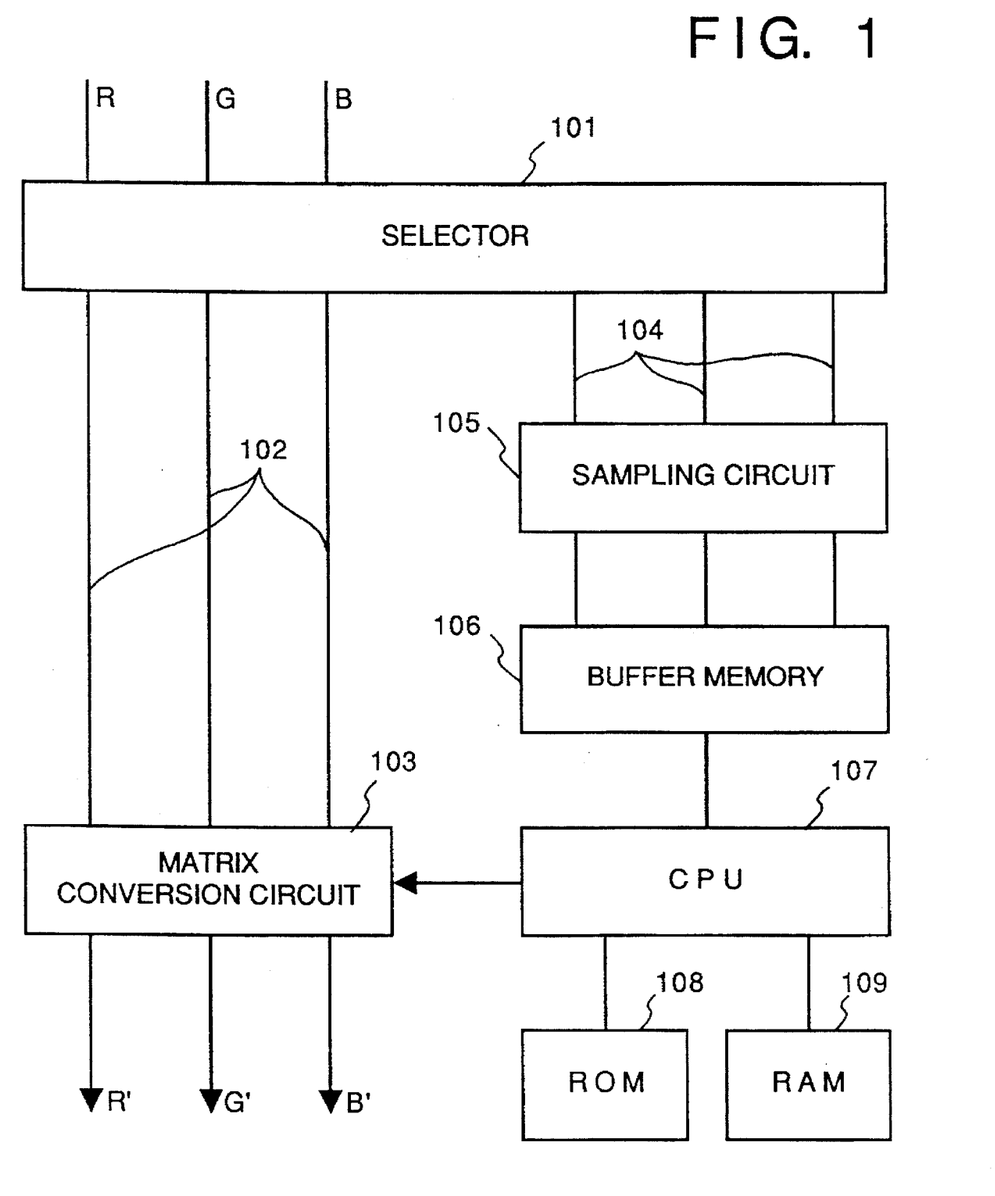
FIG. 1 is a block diagram showing an arrangement of a color image processing apparatus according to the first embodiment of the present invention.

FIG. 1 is a block diagram showing an arrangement of a color image processing apparatus according to the first embodiment of the present invention. In FIG. 1, reference numeral 101 denotes a selector; 102 and 104, buses; 103, a matrix conversion circuit; 105, a sampling circuit; 106, a buffer memory; 107, a CPU; 108, a ROM storing a program for operating the CPU 107; and 109, a RAM for storing various parameters and various programs.

The operation of the above arrangement will be described below with reference to FIG. 1.

When image signal compression is to be executed, input R, G, and B signals are output onto the bus 102 by the selector 101, and are converted into output signals R', G', and B' via the matrix conversion circuit 103. When the chromatic signal distribution in an input image is to be detected, the input R, G, and B signals are output onto the bus 104, and are sampled by the sampling circuit 105 at a predetermined sampling pitch. Thereafter, the sampled signals are written in the buffer memory 106. The CPU 107 sequentially reads out the image signals stored in the buffer memory 106, and detects a chrominance signal having the highest saturation in an image by a method to be described later. The CPU 107 calculates matrix conversion coefficients from the detection result by a method to be described later, and sets the calculated coefficients in the matrix conversion circuit 103.

Figure 2:
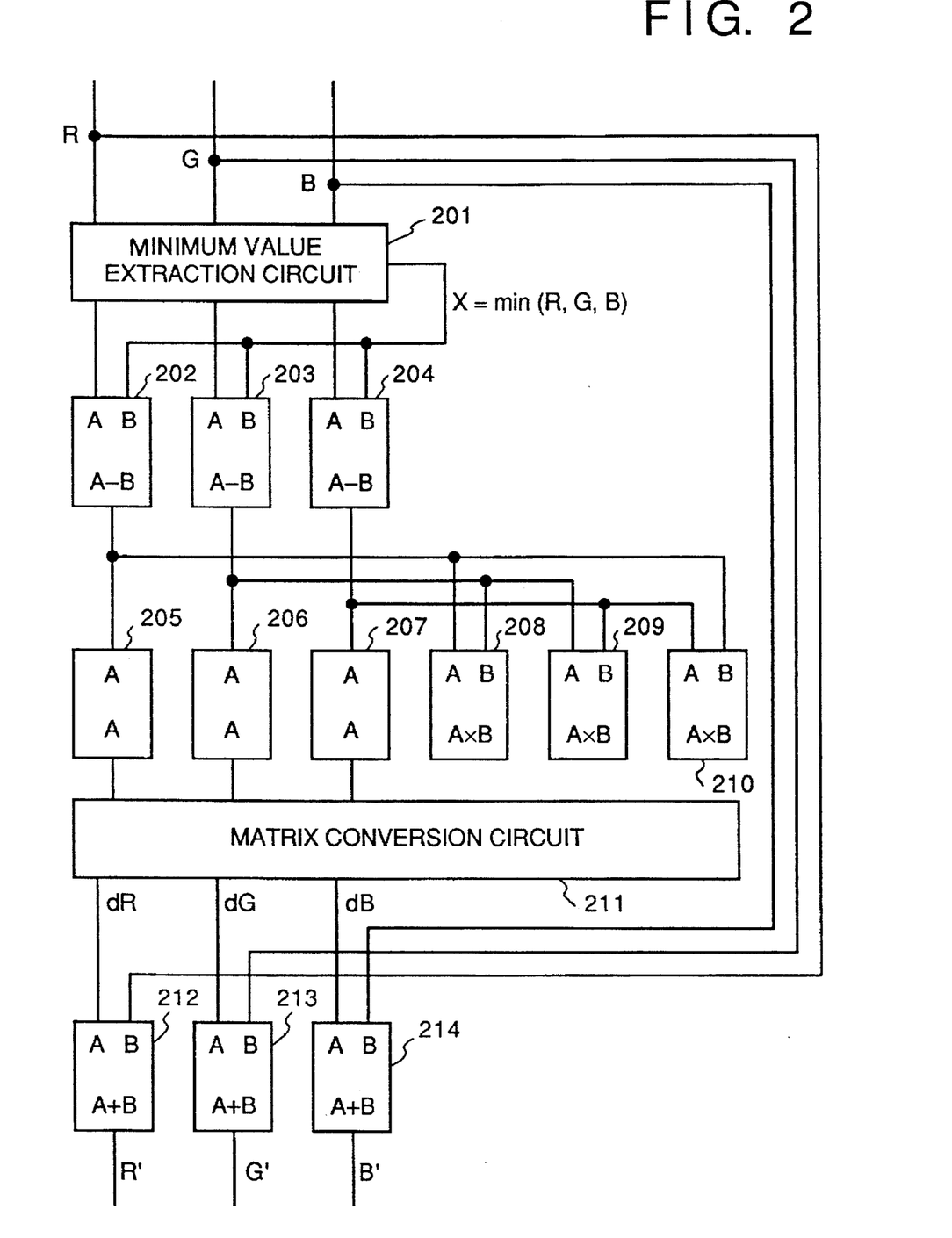
FIG. 2 is a block diagram showing a circuit for realizing a matrix conversion circuit 103 shown in FIG. 1.

FIG. 2 is a block diagram showing a circuit for realizing the matrix conversion circuit 103 in the first embodiment. In FIG. 2, input color image signals are input from the above in the plane of drawing. The image signals are sequentially transferred to below the plane of drawing together with driving clocks and a reset signal (neither are shown).

Reference numeral 201 denotes a minimum extraction circuit for extracting a minimum value from the R, G, and B signals, and outputting a minimum value signal X (=min (R,G,B)). Reference numerals 202, 203, and 204 denote subtracters each for subtracting the minimum value signal from an input signal. The subtracter 202 outputs R–X, the subtracter 203 outputs G–X, and the subtracter 204 outputs B–X. Reference numerals 205, 206, and 207 denote latch circuits for temporarily latching the outputs from the subtracters 202, 203, and 204, respectively. Reference numerals 208, 209, and 210 denote multipliers for respectively calculating quadratic terms of R–X, G–X, and B–X. The multiplier 208 outputs (R–X)×(G–X), the multiplier 209 outputs (G–X)×(B–X), and the multiplier 210 outputs (B–X)×(R–X). Reference numeral 211 denotes a matrix conversion circuit for executing matrix conversion of six or more signal values obtained by the latch circuits 205 to 207 and the multipliers 208 to 210. More specifically, the matrix conversion circuit 211 executes a calculation given by following equation (1), and outputs dR, dG, and dB.

$$\begin{bmatrix} dR \\ dG \\ dB \end{bmatrix} = \begin{bmatrix} a_{11} a_{12} a_{13} a_{14} a_{15} a_{16} \\ a_{21} a_{22} a_{23} a_{24} a_{25} a_{26} \\ a_{31} a_{32} a_{33} a_{34} a_{35} a_{36} \end{bmatrix} \times \begin{bmatrix} R-X \\ G-X \\ B-X \\ (R-X)\cdot(G-X) \\ (G-X)\cdot(B-X) \\ (B-X)\cdot(R-X) \end{bmatrix} \quad (1)$$

The matrix coefficients $a_{ij}$ used in this equation are calculated by a method to be described later.

Reference numerals 212, 213, and 214 denote adders for respectively adding the outputs dR, dG, and dB calculated by equation (1) and the original R, G, and B signals, and outputting converted color-separated signals R', G', and B'. More specifically, these adders execute a calculation given by the following equation (2):

$$\begin{bmatrix} R' \\ G' \\ B' \end{bmatrix} = \begin{bmatrix} R \\ G \\ B \end{bmatrix} + \begin{bmatrix} dR \\ dB \\ dG \end{bmatrix} \quad (2)$$

The method of calculating the matrix conversion coefficients $a_{ij}$ in equation (1) described above will be described below. The matrix conversion has as its object to map colors over a wide color range included in an input image in the color reproduction range of a hard copy. In this case, reproduction of red will be examined first.

Assume that each of R, G, and B image signals is expressed by 8 bits, and red having the highest saturation included in an input image corresponds to a chrominance signal defined by R=200, G=15, and B=0. This color is present at a point $R_i$ on the chromaticity diagram of FIG. 3. However, since red having the highest saturation, which can be reproduced by a hard copy, is that at a point $R_H$, all colors present between $R_H$ and $R_C$ are undesirably output as the point $R_H$ in a hard copy.

Conversely, when chrominance signal values at the point $R_H$ are expressed by R, G, and B signals, they are normally about R=160, G=20, and B=10. Therefore, when input chrominance signal values R=200, G=15, and B=10 are converted by the matrix conversion circuit to have R'=160, G'=20, and B'=10, the point $R_i$ is converted to the point $R_H$, and colors between these points are mapped inside the point $R_H$. Thus, the color reproduction range included in an input image can be mapped in the color reproduction range of a hard copy while preserving the primary colors of the input signals.

When such a correspondence is set for all the six primary colors, 18 simultaneous linear equations are obtained from equations (1) and (2) described above. Since there are 18 unknowns $a_{ij}$, these equations can be uniquely solved, and the matrix conversion coefficients can be determined.

An example of the above-mentioned correspondence is listed below.

Red: R=200, G=15, B=0 → R'=160, G'=20, B'=10

Green: R=10, G=220, B=5 → R'=20, G'=100, B'=20

Blue: R=0, G=10, B=180 → R'=15, G'=10, B'=100

Cyan: R=10, G=180, B=220 → R'=10, G'=95, B'=200

Magenta: R=230, G=10, B=190 → R'=200, G'=10, B'=90

Yellow: R=255, G=250, B=0 → R'=255, G'=250, B'=10     (3)

Figure 4:
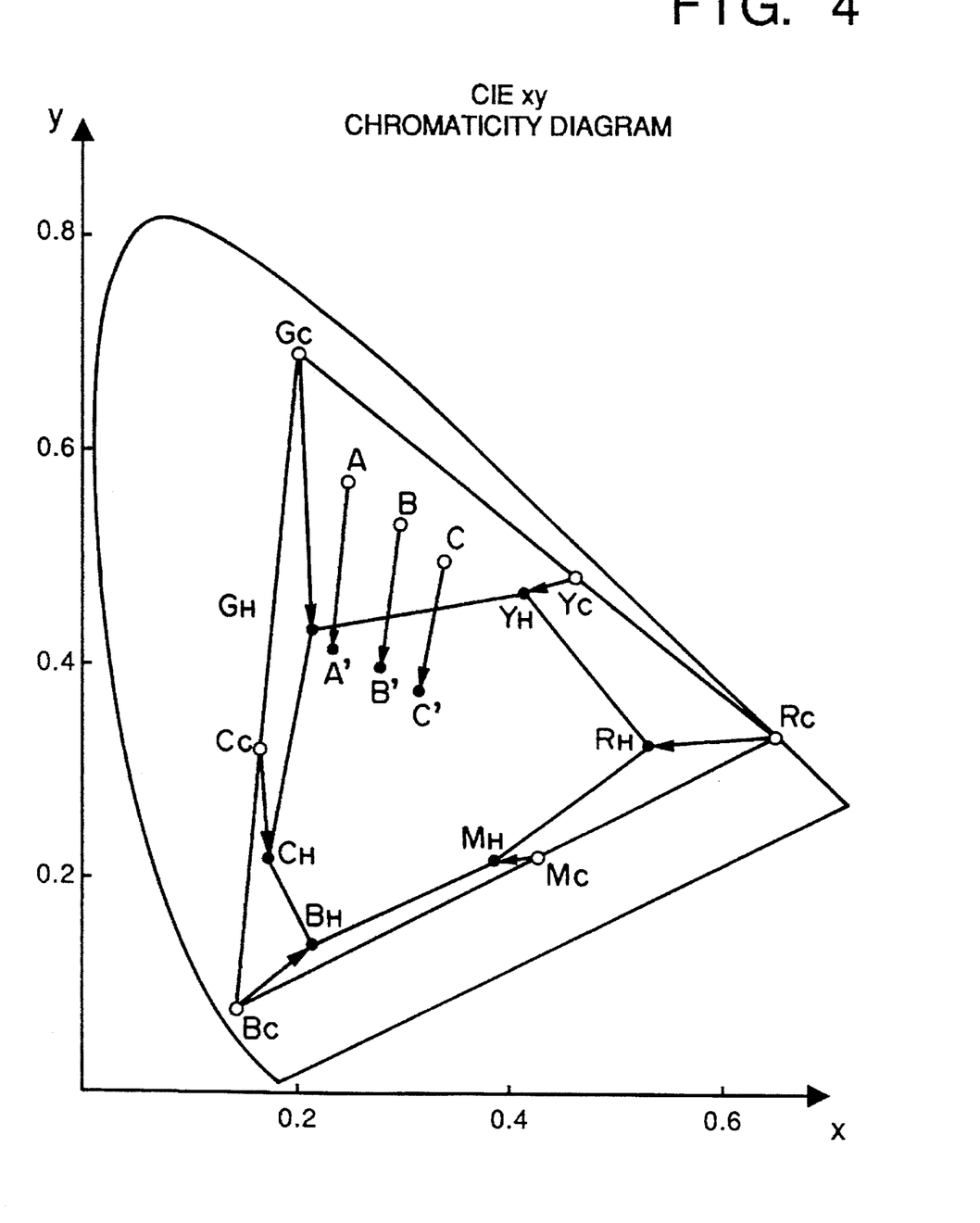
FIG. 4 is a chromaticity diagram showing a color conversion state according to the first embodiment.

With the above-mentioned sequence, desired chrominance signal conversion results shown in FIG. 4 can be obtained as results of equation (1). At this time, if achromatic signals are input, since an achromatic color is represented by R=G=B, their minimum value signals X are also equal to each other. More specifically, the subtracters 202, 203, and 204 output "0", and matrix conversion results are also dR=dG=dB=0. Furthermore, output signals R', G', and B' are not influenced by conversion, and input signal values are directly output. As a result, achromatic color signals are preserved.

<Second Embodiment>

In the first embodiment, all possible colors which can be reproduced by a CRT are mapped into the color reproduction range of a hard copy. However, an input image does not always include all colors in the color reproduction range of the CRT.

Figure 5:
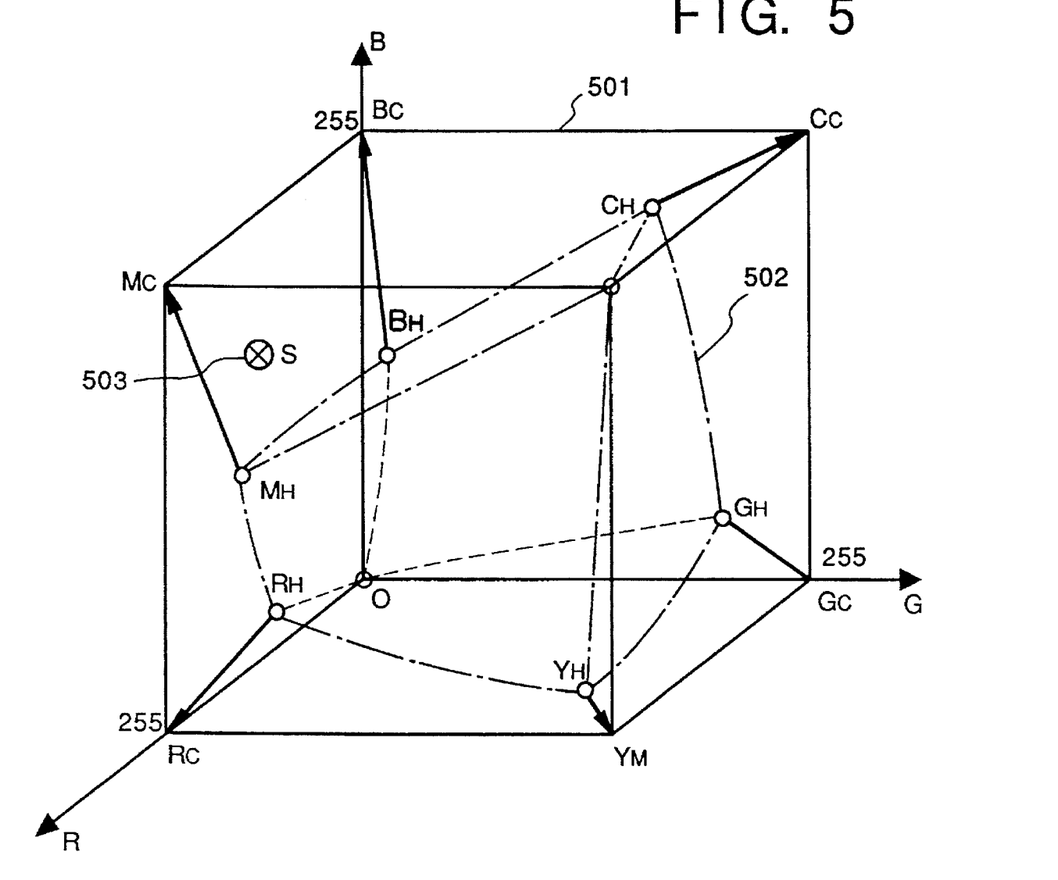
FIG. 5 is a chart obtained by plotting a CRT color reproduction range and a hard copy color reproduction range on an RGB signal space.

Thus, in the second embodiment, a case will be explained below wherein the matrix conversion coefficients of equation (1) described above are adaptively changed. FIG. 5 is a chart obtained by plotting the color reproduction range of a CRT and the color reproduction range of a hard copy onto an RGB signal space. As shown in FIG. 5, a cube 501 represents the color reproduction range of the CRT, and a deformed cube 502 represents the color reproduction range of the hard copy. In this embodiment, chrominance signals included in an input image are initially sampled, a color having the highest saturation on the RGB color space is detected, and the matrix coefficients of equation (1) are determined according to the detected value. Assume that the signal values of a certain pixel in an input image are represented by $R_S$, $G_S$, $B_S$, and the position of the pixel is a point S (503) in FIG. 5.

Figure 6:
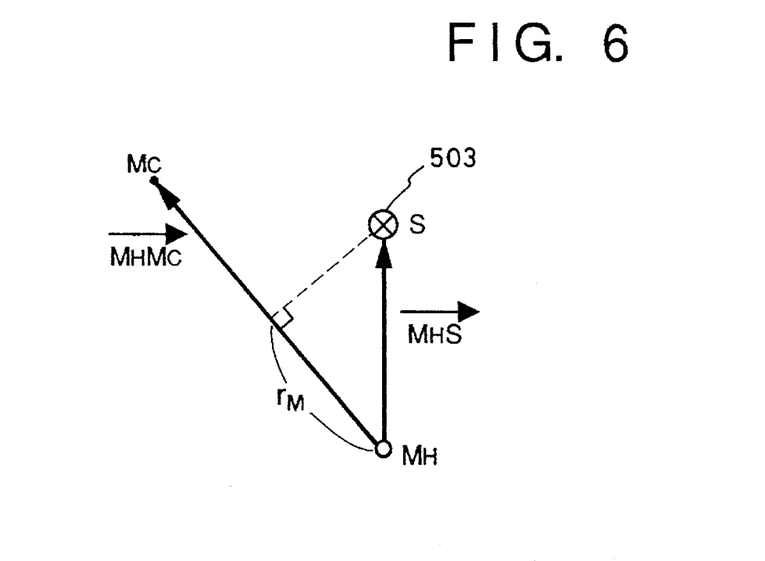
FIG. 6 is an enlarged view of main part of FIG. 5.

In this case, values to be obtained are R, G, and B signal values of a color having the highest saturation of each of the six primary colors R, G, B, Y, M, and C. For this purpose, vectors shown in FIG. 6 will be examined. In this case, FIG. 6 shows vectors in an M (magenta) direction. In FIG. 6, $M_H$ denotes the coordinates of magenta of a hard copy on the RGB space; and $M_C$, the coordinates of magenta of a CRT on the RGB space. These coordinates represent the same positions as in FIG. 5.

First, a vector $M_HS$ from the point $M_H$ toward an input color S and a vector $M_HM_C$ from the point $M_H$ to the point $M_C$ are assumed, and a direction cosine $r_M$ of the vector $M_HS$ in the direction of the vector $M_HM_C$ is obtained. As $r_M$ is larger, the saturation of the input color S in the magenta direction becomes higher. $r_M$ can be calculated by an inner product calculation given by equation (4):

$$r_M = (M_HS, M_HM_C)/|M_HM_C| \quad (3)$$

where (X, Y) is the inner product of vectors X and Y, and |Z| is the absolute value of a vector Z.

Similarly, direction cosines $r_R$, $r_G$, $r_B$, $r_Y$, and $r_C$ in the directions of the remaining primary colors are calculated, and the maximum value of these cosines can be selected to determine the direction (hue) of the input color.

When the maximum value of the direction cosines of all pixels in the input image or pixels sampled at a predetermined sampling pitch is calculated in units of primary colors in this manner, R, G, and B signal values which give the maximum value are the chrominance signal values to be obtained.

Figure 7:
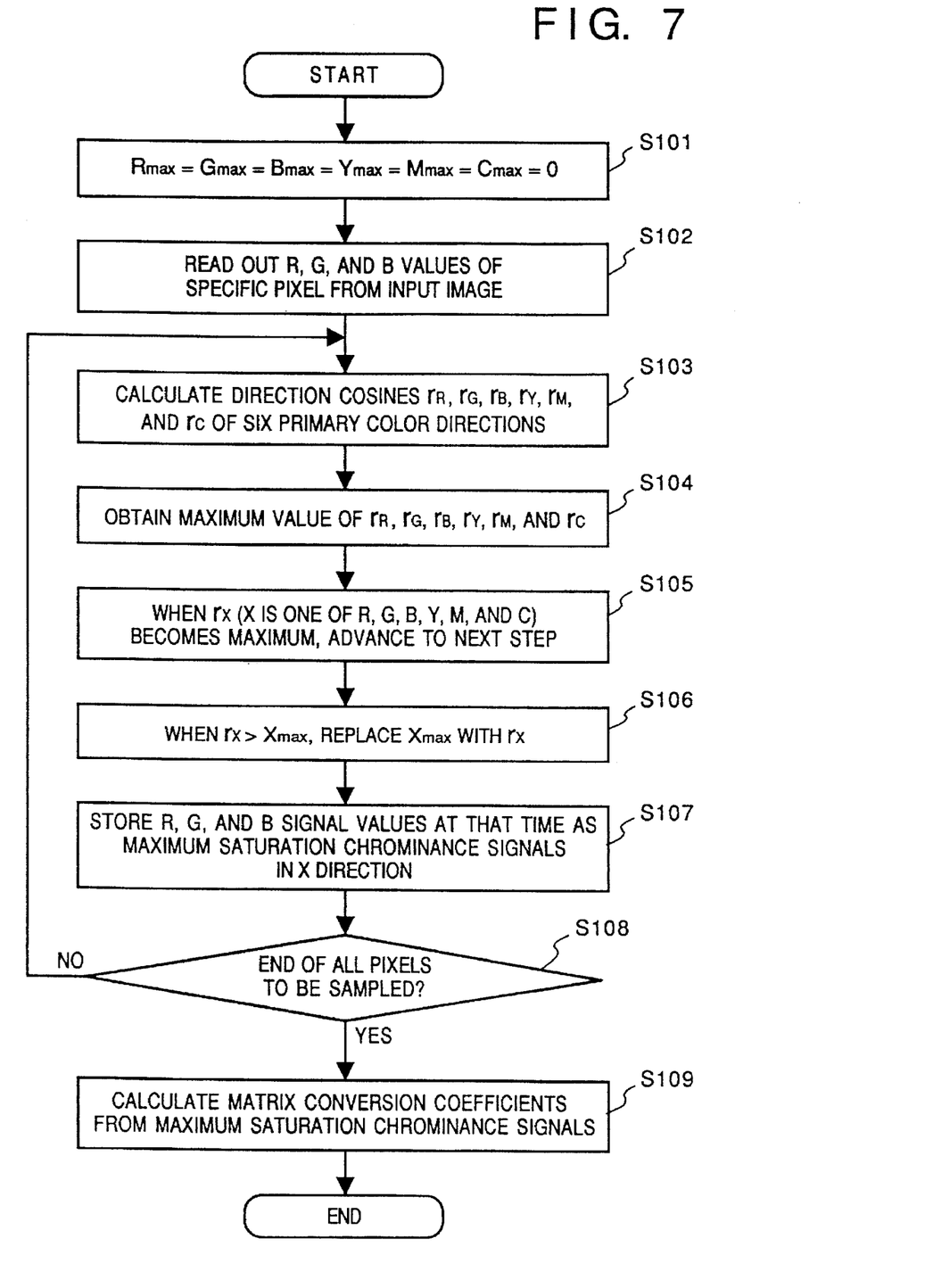
FIG. 7 is a flow chart showing an operation according to the second embodiment of the present invention.

FIG. 7 is a flow chart showing the above-mentioned sequence. In step S101, maximum values $R_{max}$, $G_{max}$, $B_{max}$, $Y_{max}$, $M_{max}$, and $C_{max}$ of direction cosines in the primary color directions are initialized. In step S102, R, G, and B values of a specific pixel are read out from an input image, and in step S103, direction cosines $r_R$, $r_G$, $r_B$, $r_Y$, $r_M$, and $r_C$ in the six primary color directions are calculated. In step S104, the maximum value of the calculated direction cosines is obtained, and in step S105, the maximum value is determined as $r_X$ (X will represent one of R, G, B, Y, M, and C hereinafter).

In step S106, if the maximum value $r_X$ is larger than $X_{max}$, the $X_{max}$ is replaced with $r_X$. In step S107, R, G, and B signal values at that time are stored as maximum saturation chrominance signals in the X direction. In step S108, it is checked if processing is completed for all pixels to be sampled. If the processing is not completed, the flow returns to step S102 to repeat the above-mentioned processing. Thereafter, if the processing is completed for all the pixels, the flow advances to step S109, and the matrix conversion coefficients are calculated from the maximum saturation chrominance signals.

The obtained R, G, and B signal values are replaced with data on the left-hand side of the correspondence among primary colors given by relations (3). When the matrix conversion coefficients are calculated based on the replaced correspondence in the same manner as described above, they can be optimal for an input image.

As described above, according to the first and second embodiments, a color image reproduced on, e.g., a CRT monitor having a wide color reproduction range can be converted into color image signals suitable for a hard copy output without losing original information. At this time, the gray balance of an original image will not be disturbed.

<Third Embodiment>

In the first and second embodiments, a method of detecting the six primary color signal values having the highest saturation (R, G, and B signals on the left-hand side of relations (3) above) from an input image signal has been described. A method of performing such detection in a color space will be described in detail below with reference to the drawings.

Figure 8:
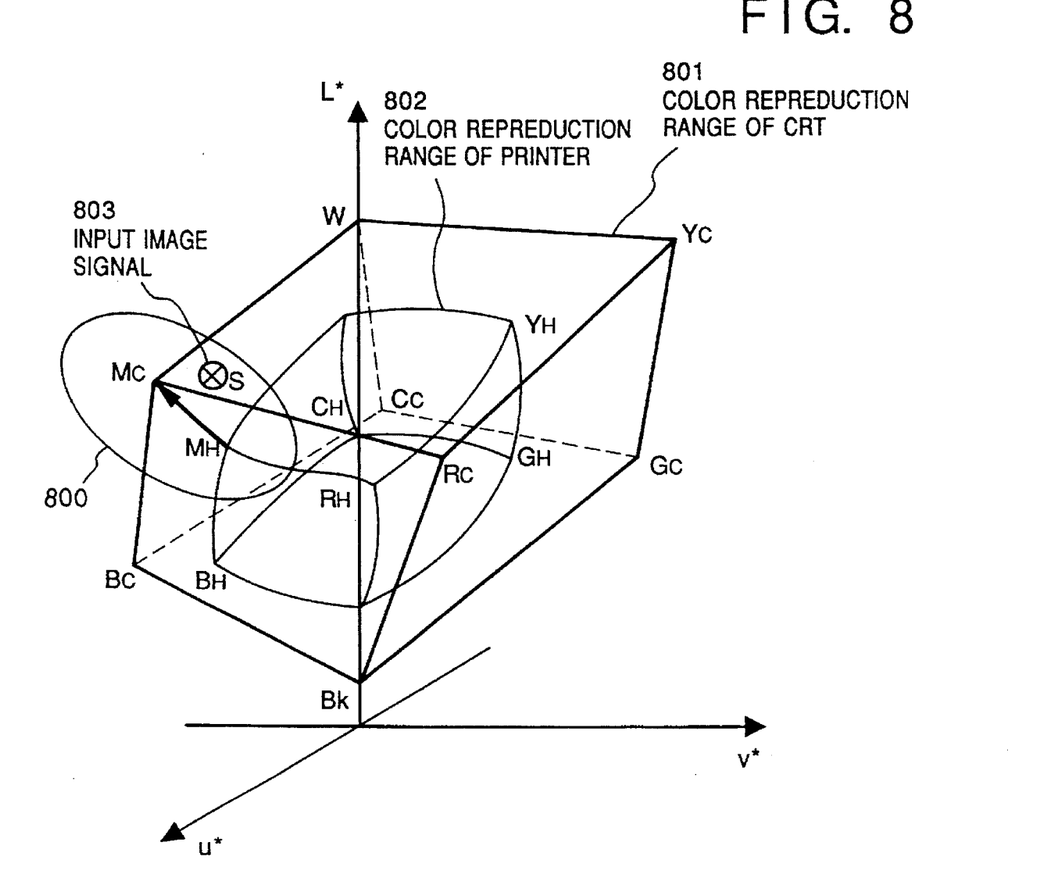
FIG. 8 is a chart obtained by plotting a CRT color reproduction range and a hard copy color reproduction range on an L*u*v* uniform color space.

FIG. 8 is a chart obtained by plotting the color reproduction range of a CRT and the color reproduction range of a hard copy on an L*u*v* uniform color space. The L*u*v* space is a uniform color space defined by the CIE (Commission Internationale de l'Eclairage), and almost linearly corresponds to the visual sense characteristics of man. In order to convert R, G, and B signals into L*, u*, and v* signals, the following equations (5) to (7) can be used.

$$L^* = 116(Y/Y_0)^{1/3} - 16$$
$$u^* = 13L^*(u - u_0)$$
$$v^* = 13L^*(v - v_0) \quad (5)$$

for $$u = 4X/(X + 15Y + 3Z)$$
$$v = 9Y/(X + 15Y + 3Z) \quad (6)$$

Also, $$X = 0.6067R + 0.1736G + 0.2001B$$
$$Y = 0.2988R + 0.5868G + 0.1144B$$
$$Z = 0.0000R + 0.0661G + 1.1150B \quad (7)$$

Figure 9:
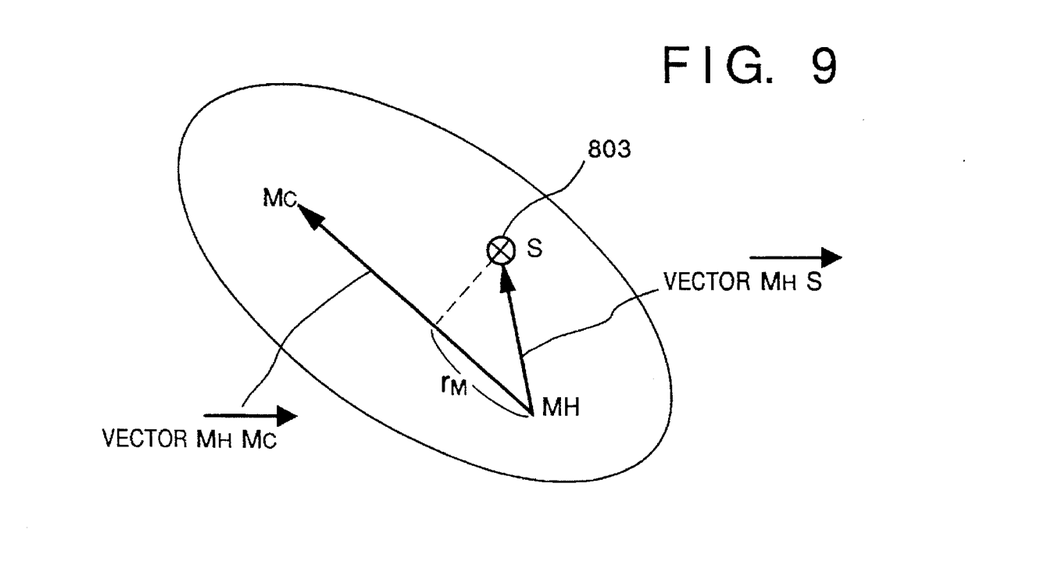
FIG. 9 is an enlarged view of main part of FIG. 8.

In FIG. 8, a hexahedron 801 represents the color reproduction range of a CRT, and a hexahedron 802 represents the color reproduction range of a hard copy. In this embodiment, chrominance signals included in an input image are initially sampled, a color having the highest saturation on the L*u*v* color space is detected, and the matrix coefficients of equation (1) are determined based on the detected value. Assume that the signal values of a certain pixel in an input image are $R_S$, $G_S$, $B_S$. When these values are converted into L*, u*, and v* values, the converted values define a point S denoted by reference numeral 803 in FIG. 8. In this case, values to be obtained are R, G, and B signal values of a color having the highest saturation of each of six primary colors R, G, B, Y, M, and C. Thus, vectors shown in FIG. 9 (the enlarged view of a range denoted by reference numeral 800 in FIG. 8) will be examined below. FIG. 9 shows vectors in an M (magenta) direction. In FIG. 9, $M_H$ denotes the coordinates of magenta of a hard copy on the L*u*v* space; and $M_C$, the coordinates of magenta of a CRT on the L*u*v* space. These coordinates represent the same positions as in FIG. 8. A vector $M_H S$ from the point $M_H$ toward an input color S and a vector $M_H M_C$ from the point $M_H$ to the point $M_C$ are assumed, and a direction cosine $r_M$ of the vector $M_H S$ in the direction of the vector $M_H M_C$ is obtained. As $r_M$ is larger, the saturation of the input color S in the magenta direction becomes higher. $r_M$ can be calculated by the inner product calculation given by equation (4) above.

Similarly, direction cosines $r_R$, $r_G$, $r_B$, $r_Y$, and $r_C$ in the directions of the remaining primary colors are calculated, and the maximum value of these cosines can be selected to determine the direction (hue) of the input color.

When the maximum value of the direction cosines of all pixels in the input image or pixels sampled at a predetermined sampling pitch is calculated in units of primary colors in this manner, R, G, and B signal values obtained by inversely converting the L*, u*, and v* values which give the maximum value are the chrominance signal values to be obtained.

Figure 10:
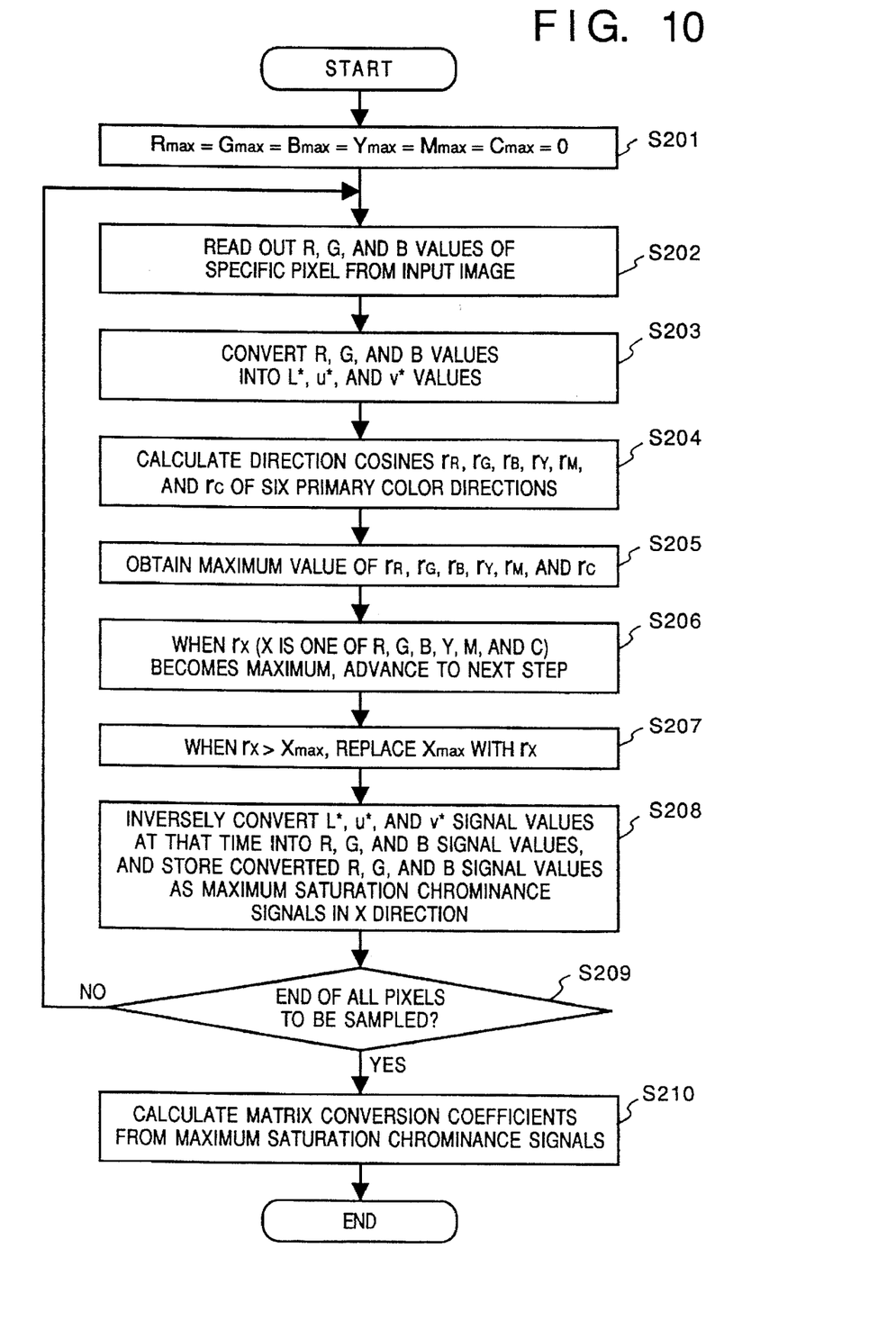
FIG. 10 is a flow chart showing an operation according to the third embodiment of the present invention.

FIG. 10 is a flow chart showing the above-mentioned sequence. Note that this processing is controlled by the CPU 107.

In FIG. 10, $R_{max}$, $G_{max}$, $B_{max}$, $Y_{max}$, $M_{max}$, and $C_{max}$ respectively represent the maximum values of direction cosines in the primary color directions. These maximum values are set to be "0" (step S201). Then, R, G, and B values of a specific pixel are read out from an input image (step S202). The readout R, G, and B signal values are processed as data on the left-hand side of the correspondence among primary colors of relations (3). The R, G, and B values are converted into L*, u*, and v* values (step S203). Cosines $r_R$, $r_G$, $r_B$, $r_Y$, $r_M$, and $r_C$ in the six primary color directions are calculated (step S204), and a maximum value is obtained from the calculated cosines (step S205).

When $r_X$ (X is one of R, G, B, Y, M, and C) is selected as the maximum value (step S206), if $r_X > X_{max}$, $X_{max}$ is replaced with $r_X$ (step S207). At this time, the L*, u*, and v* signals are inversely converted into R, G, and B signals, and the converted R, G, and B signals are stored as maximum saturation signals in the X direction (step S208). If processing for all pixels to be sampled is completed, the flow advances to step S210; otherwise, the flow returns to step S202 to repeat the above-mentioned processing. In step S210, the matrix conversion coefficients are calculated based on the maximum saturation signals. In this manner, the conversion coefficients optimal for an input image can be obtained.

<Fourth Embodiment>

In the third embodiment, a color (input image signal 803) corresponding to the maximum direction cosine of those in the respective primary color directions is selected as a maximum saturation chrominance signal from an input image signal. In this case, if the point of the input image signal 803 is largely separated from a line (the vector $M_H M_C$ in FIG. 9) connecting the primary colors of the hard copy and those of the monitor, since the maximum saturation chrominance signals are converted into the primary colors of the hard copy, a change in hue undesirably occurs.

Figure 11:
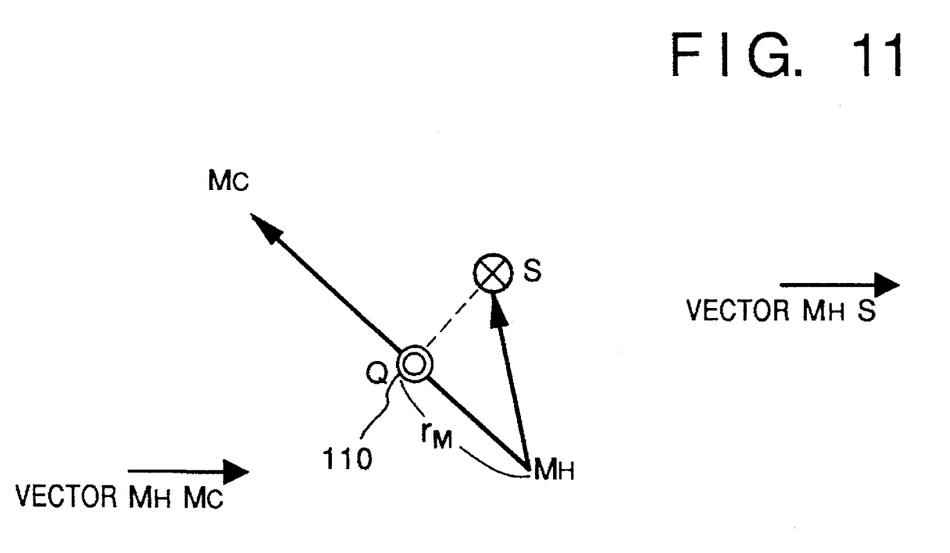
FIG. 11 is a vector chart upon detection of a maximum saturation color in a magenta direction according to the fourth embodiment of the present invention.

In the fourth embodiment, hard copy primary colors and monitor primary colors detected as maximum saturation chrominance signals are limited to those on the line in the uniform color space. FIG. 11 shows this state.

FIG. 11 shows a case wherein the maximum saturation color in the magenta direction is detected as in FIG. 9, and reference symbols have the same meanings as those in FIG. 9. In this embodiment, a chrominance signal S corresponding to the maximum direction cosine in the direction of the vector $M_H M_C$ is obtained like in the third embodiment. After S is obtained, a point Q denoted by reference numeral 110 in FIG. 11 becomes an actual maximum saturation chrominance signal. The point Q is a point on the vector $M_H M_C$ and separated from the point $M_H$ by a distance $r_M$, i.e., is a point obtained by projecting the maximum saturation chrominance signal obtained in the third embodiment onto the vector $M_H M_C$. The L*, u*, and v* values of this point 110 can be calculated by simple vector calculations. When these values are inversely converted into R, G, and B signal values, target signal values can be obtained.

<Fifth Embodiment>

In the third and fourth embodiments, the CIE L*u*v* uniform color space is used as a uniform color space. However, the same effect can be expected if other uniform color spaces are used.

For example, the CIE L*a*b* color space may be used. In order to simplify conversion calculations into a uniform color space, R, G, and B signals are raised to the ⅓rd power to obtain R', G', and B' signals using an LUT or the like, and these converted values are converted into signal values (to be referred to as L, c1, and c2 hereinafter) close to the uniform color space. These values may be used in processing.

$R'=(R/255)^{1/3}$ $G'=(G/255)^{1/3}$ $B'=(B/255)^{1/3}$ $L=100(R'+G'+B')/3$ $c1=100(R'-G')$ $c2=100(R'/2+G'/2-B')$ (8)

Although L, c1, and c2 obtained here have relatively inferior color space uniformity, the load on the CPU can be reduced since they can be obtained by simple calculations.

As described above, according to the third to fifth embodiments, a color image reproduced on, e.g., a CRT monitor having a wide color reproduction range can be converted into color image signals suitable for a hard copy output without losing original information.

Note that the present invention may be applied to either a system consisting of a plurality of devices or an apparatus consisting of a single device.

Also, the present invention may be applied to a case wherein the invention is achieved by supplying a program to the system or apparatus.

The present invention has been described with reference to its preferred embodiments. However, the present invention is not limited to the above embodiments, and various modifications may be made within the scope of the claims.

What is claimed is:

1. A color image processing apparatus for gamut mapping color image data into a gamut of an output device, comprising:

inputting means for inputting color image data comprised of a plurality of color components;

extracting means for extracting achromatic color component data which corresponds to a minimum value of the color components in the color image data;

first generating means for generating difference data which defines a difference between the achromatic color component data and each of the color components of the color image data;

second generating means for generating correction data for the color image data using the difference data; and gamut mapping means for gamut mapping the color image data into the gamut of the output device using the correction data.

2. The apparatus according to claim 1, wherein said inputting means inputs color image data comprised of R, G, and B color signals.

3. The apparatus according to claim 1, wherein said second generating means includes conversion means for executing matrix conversion on the difference data in order to generate the correction data, and setting means for adaptively setting matrix coefficients for the matrix conversion in accordance with a color distribution of the color image data.

4. The apparatus according to claim 3, wherein the setting means comprises (1) calculating means for calculating inner products between a vector defined by predetermined chrominance signal values, and a vector defined by color signal values in the color image data, (2) detecting means for detecting a maximum value of the inner products, (3) storing means for storing the color signal values when the maximum value of the inner products is obtained, and (4) solving means for obtaining the matrix coefficients by solving simultaneous equations defined by the color signal values stored in the storing means.

5. The apparatus according to claim 1, wherein the color image data defines an object image, and wherein said gamut mapping means performs gamut mapping on the color image data so that the object image fits inside the gamut of the output device.

6. A color image processing method for gamut mapping color image data into a gamut of an output device, comprising the steps of:

inputting color image data comprised of a plurality of color components;

extracting achromatic color component data which corresponds to a minimum value of the color components in the color image data;

generating difference data which defines a difference between the achromatic color component data and each color component of the color image data;

generating correction data for the color image data using the difference data and the color image data; and gamut mapping the color image data into the gamut of the output device using the correction data.

7. A color image processing apparatus for gamut mapping color image data for an object image into a gamut of an output device, comprising:

inputting means for inputting color image data for the object image;

detecting means for detecting a color distribution of the color image data for the object image;

calculating means for calculating matrix coefficients using the color distribution detected by said detecting means; and gamut mapping means for gamut mapping the color image data for the object image into the gamut of the output device using the matrix coefficients.

8. The apparatus according to claim 7, further comprising transforming means for transforming the color image data for the object image into color image signals on a uniform color space, wherein said gamut mapping means uses the color image signals to gamut map the color image data for the object image into the gamut of the output device.

9. The apparatus according to claim 7, wherein said gamut mapping means performs gamut mapping on the color image data for the object image so that the object image fits inside the gamut of the output device.

10. A color image processing method for gamut mapping color image data for an object image into a gamut of an output device, comprising the steps of:

inputting color image data for the object image;

detecting a color distribution of the color image data for the object image;

calculating matrix coefficients using the color distribution detected in said detecting step; and gamut mapping the color image data for the object image into the gamut of the output device using the matrix coefficients.

11. The apparatus according to claim 1, wherein said second generating means includes correcting means for correcting the difference data prior to generating the correction data, and wherein said gamut mapping means includes adding means for adding the correction data to the color image data in order to map the color image data into the gamut of the output device.

12. The apparatus according to claim 7, wherein the output device comprises an image forming means, and wherein said calculating means calculates the matrix coefficients based on a gamut of the image forming means.

13. A color image processing apparatus comprising:

calculating means for calculating matrix coefficients for mapping color image data for an input image into a color gamut of an image forming means using first information which defines a color gamut of the input image, and second information which defines the color gamut of the image forming means;

color gamut mapping means for mapping the color image data for the input image into the color gamut of the image forming means by performing matrix calculations on the color image data using the matrix coefficients; and outputting means for outputting the color image data mapped by said color gamut mapping means to the image forming means.

14. The apparatus according to claim 13, wherein said calculating means calculates the matrix coefficients using first and second information comprised of color image data having hues of R, G, B, C, M, and Y.

15. The apparatus according to claim 13, wherein said calculating means calculates the matrix coefficients for mapping color image data comprising R, G, and B data.

16. A color image processing method comprising the steps of:

calculating matrix coefficients for mapping color image data for an input image into a color gamut of an image forming means using first information which defines a color gamut of the input image, and second information which defines the color gamut of the image forming means;

mapping the color image data for the input image into the color gamut of the image forming means by performing matrix calculations on the color image data using the matrix coefficients; and outputting the color image data mapped in said mapping step to the image forming means.

17. A color image processing apparatus comprising:

inputting means for inputting color image data for an object image;

outputting means for outputting high-saturation data for a plurality of hues in the color image data for the object image, the high-saturation data corresponding to a color gamut of the color image data for the object image; and color gamut mapping means for mapping the color image data for the object image into a color gamut of an image outputting means using a parameter which is based on the high-saturation data for the plurality of hues.

18. The apparatus according to claim 17, wherein said outputting means outputs high-saturation data for the plurality of hues comprising R, G, B, C, M, and Y.

19. The apparatus according to claim 17, wherein said color gamut mapping means maps the color image data by using matrix coefficients.

20. The apparatus according to claim 17, wherein said inputting means inputs color image data comprised of R, G, and B data.

21. A color image processing method comprising the steps of:

inputting color image data for an object image;

gamut mapping the color image data for the object image into a color gamut of an image output means based on high-saturation colors in each of a plurality of hues in the color image data for the object image; and outputting the color image data mapped in said gamut mapping step to the image output means;

wherein said gamut mapping step performs gamut mapping so that the high-saturation colors in each of the plurality of hues in the color image data for the object image are converted into high-saturation colors for the color gamut of the image output means.

22. The method according to claim 21, wherein said gamut mapping step performs gamut mapping on the color image data for the object image so that the object image fits inside of the gamut of the image output means.

23. The method according to claim 21, wherein said gamut mapping step maps the color image data for the object image so that the high-saturation colors in each of the plurality of hues in the color image data for the object image comprise high-saturation colors for representing the color gamut of the image output means.

* * * * *

UNITED STATES PATENT AND TRADEMARK OFFICE
CERTIFICATE OF CORRECTION

PATENT NO. : 5,657,068

DATED : August 12, 1997

INVENTOR : Ohta

It is certified that error appears in the above-identified patent and that said Letters Patent is hereby corrected as shown below:

COLUMN 3:

Equation (1), "$a_{11}\ a_{12}\ a_{12}\ a_{14}\ a_{15}\ a_{16}$" should read
--$a_{11}\ a_{12}\ a_{13}\ a_{14}\ a_{15}\ a_{16}$--, "$a_{21}\ a_{22}\ a_{22}\ a_{24}\ a_{25}\ a_{26}$" should read
--$a_{21}\ a_{22}\ a_{23}\ a_{24}\ a_{25}\ a_{26}$--, and "$a_{31}\ a_{32}\ a_{32}\ a_{34}\ a_{35}\ a_{36}$" should read
--$a_{31}\ a_{32}\ a_{33}\ a_{34}\ a_{35}\ a_{36}$--.

Signed and Sealed this

Twenty-fourth Day of March, 1998

Attest:

BRUCE LEHMAN

Attesting Officer

Commissioner of Patents and Trademarks